United States Patent [19]
Wright et al.

[11] Patent Number: 5,637,209
[45] Date of Patent: Jun. 10, 1997

[54] FIELD-PORTABLE SUPERCRITICAL $CO_2$ EXTRACTOR

[75] Inventors: Bob W. Wright; Thomas S. Zemanian; William H. Robins, all of Richland; Leslie J. Woodcock, Benton City, all of Wash.

[73] Assignee: Battelle Memorial Institute, Richland, Wis.

[21] Appl. No.: 588,585

[22] Filed: Jan. 18, 1996

[51] Int. Cl.[6] .................................................. B01D 11/00
[52] U.S. Cl. ........................ 210/137; 210/149; 210/181; 210/241; 210/511; 210/634; 422/261; 422/277
[58] Field of Search ............................. 422/261, 277; 210/137, 143, 149, 180, 181, 241, 511, 541, 634

[56] References Cited

U.S. PATENT DOCUMENTS

| | | | |
|---|---|---|---|
| 4,898,673 | 2/1990 | Rice | 210/634 |
| 5,013,443 | 5/1991 | Higashidate | 210/511 |
| 5,087,360 | 2/1992 | Wright | 210/634 |
| 5,147,538 | 9/1992 | Wright | 210/634 |
| 5,198,197 | 3/1993 | Clay | 210/634 |
| 5,360,320 | 11/1994 | Jameson | 210/634 |
| 5,549,819 | 8/1996 | Nickerson | 210/511 |

*Primary Examiner*—Ernest G. Therkorn
*Attorney, Agent, or Firm*—Paul W. Zimmerman

[57] ABSTRACT

The present invention is an apparatus for extracting organic compounds from solid materials. A generator vessel has a removable closure for receiving a solid or liquid solvent which is heated with a resistive heating element to a gaseous or supercritical phase. The removable closure is unencumbered because the side wall is penetrated with an outlet for the gaseous or supercritical solvent. The generator vessel further has a pressure transducer that provides an electronic signal related to pressure of the gaseous or supercritical solvent. The apparatus of the present invention further includes at least one extraction cell having a top and a bottom and a wall extending therebetween, wherein the bottom is sealably penetrated by an inlet for gaseous or supercritical solvent received through a manifold connected to the outlet, the top having an easy-open removable closure cap, and the wall having an outlet port. Finally, a permeable sample cartridge is included for holding the solid materials and to provide radial-flow of the extraction fluid, which is placed within the extraction cell.

12 Claims, 5 Drawing Sheets

A: Restrictorless Empty Tube Collection
B: Liquid Solvent Collection
C: Solid Sorbent Bed
PT: Porous Tube Insert with Axial Bayonet
R: Restrictor Heater
S: Porous Sock Insert in Fritted Vessel

A: Restrictorless Empty Tube Collection
B: Liquid Solvent Collection
C: Solid Sorbent Bed
PT: Porous Tube Insert with Axial Bayonet
R: Restrictor Heater
S: Porous Sock Insert in Fritted Vessel

FIELD-PORTABLE SUPERCRITICAL CO₂ EXTRACTOR

FIELD-PORTABLE SUPERCRITICAL $CO_2$ EXTRACTOR

This invention was made with Government support under Contract DE-AC06-76RLO 1830 awarded by the U.S. Department of Energy. The Government has certain rights in the invention.

FIELD OF THE INVENTION

The present invention relates generally to an apparatus for extracting organic compounds from solid materials using carbon dioxide. More specifically, the invention uses solid and/or liquid carbon dioxide heated to a supercritical phase for organic compound extractions.

BACKGROUND OF THE INVENTION

Supercritical fluid extraction is becoming a widely used method for the extraction of organic compounds from solid matrices. This extraction is used to prepare sample extracts for subsequent chemical analysis. Laboratory versions of supercritical fluid extraction devices are commercially available, for example from Suprex Corporation, Pittsburgh, Pa. However, laboratory versions of SFE apparatus are not practical for use in the field because of size and weight considerations. In addition, many commercial units require utilities (e.g., compressed air, cryogenic cooling fluids) that are impractical for use in the field.

The general problem of obtaining samples from the field using supercritical fluid extraction has been addressed. Specifically, U.S. Pat. No. 5,087,360 issued Feb. 11, 1992 to Wright et al. shows a field portable supercritical fluid extraction apparatus. This apparatus requires storing solvent gas (carbon dioxide). A high pressure liquid chromatography pump is used to raise the pressure to between 300 to 400 bar. A cooling system is included to cool the pump to avoid vapor lock. For carbon dioxide, cooling was between 0° and 9° C. The apparatus weight was about 25 kilograms and the weight of the solvent vessel and solvent was about 25 kilograms for a total system weight of about 50 kilograms.

It is desirable to further reduce weight and complexity of the apparatus for extracting samples in the field.

SUMMARY OF THE INVENTION

The invention results in an apparatus for extracting organic compounds, the apparatus with a total weight of about 28 kilograms, 14 kilograms for the solvent vessel and solvent, and 14 kilograms for the sample extraction apparatus. It will be appreciated by those skilled in the art of portable equipment that the invention may be carried by one individual.

The supercritical fluid is supplied by solvent in either solid or liquid phase, or a combination of phases. The solvent is evaporated by heating to a working pressure thereby eliminating the need for tanks of pressurized solvent gas and the need of a pumping system that usually involves small, mechanically active parts that must meet narrow tolerances and be cooled to subambient temperatures or use prohibitively large and heavy components. Further avoided is a cooling system needed to cool the pumping system. Hence, weight is reduced while reliability, robustness and safety are increased for field usage.

The sample extraction apparatus then consists of a manifold that receives solvent gas from the solvent vessel and transmits the solvent gas to one or more extraction cells. Outlets of the extraction cell(s) are directed to sample collection tubes or vials. Sample collection may be by one or more collection methods including empty tube collection, liquid solvent collection, or solid sorbent bed collection. The apparatus is designed to be user friendly with rapid, finger-tight closures on both the solvent vessel and the extraction cell(s) ("rabbit-ear" locks).

It is therefore an object of the present invention to provide a field portable supercritical solvent organic compound extraction apparatus that may be carried by one individual and that has mechanically passive components.

It is a further object of the present invention to provide a field portable supercritical solvent organic compound extraction apparatus that is operable by hand without the use of tools.

It is a further object of the present invention to minimize a solvent flow path through a sample.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1A:
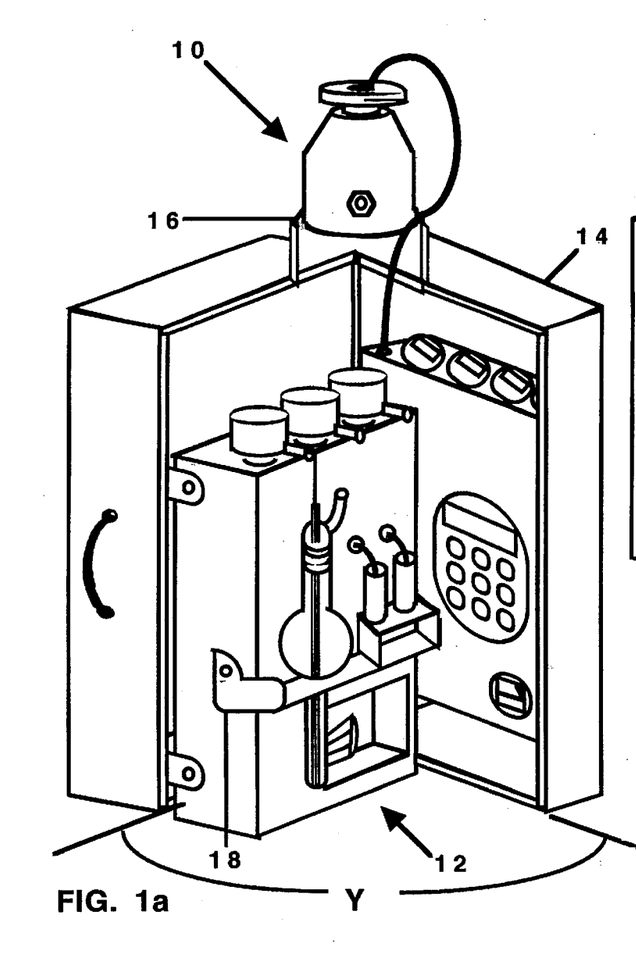
FIG. 1a is an isometric drawing of the apparatus of the present invention ready for operation.
Figure 1B:
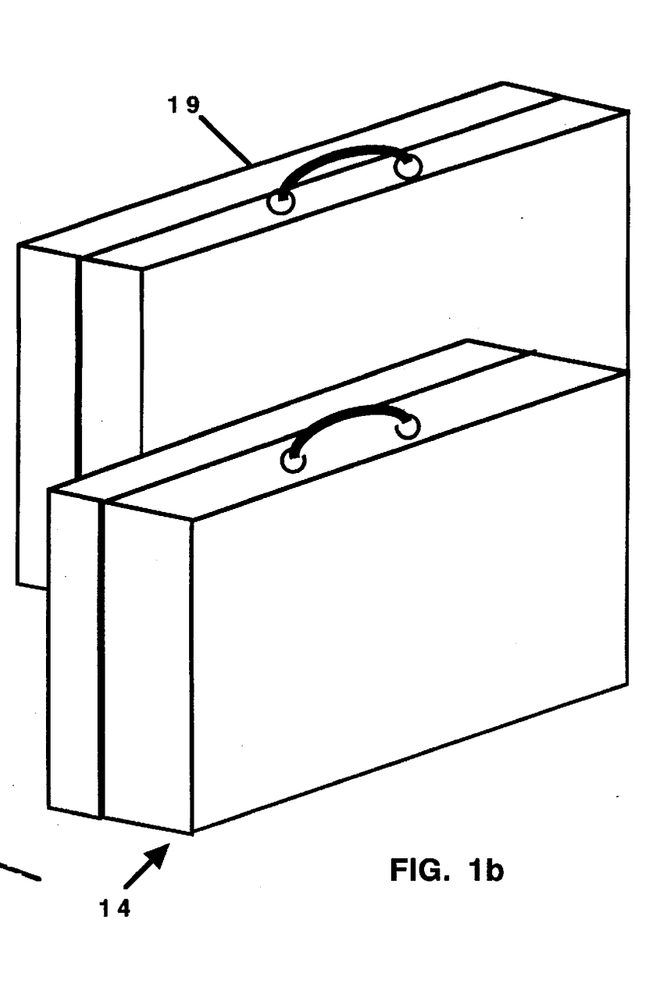
FIG. 1b is an isometric drawing of the apparatus of the present invention ready for transport.

The apparatus for extracting organic materials is shown in FIG. 1a and FIG 1b. The apparatus for extracting organic materials has a generator vessel 10 and a sample extraction apparatus 12 that is housed in case 14, preferably an aluminum briefcase. The case 14 measures approximately 41 cm long×28 cm high×21 cm deep. The case 14 opens to an angle Y of approximately 110 degrees. The generator vessel 10 may be placed anywhere, but is preferably placed in a corner support collar 16 that simultaneously holds the case 14 open at the angle A and stabilize the generator vessel 10 in an upright position.

The case 14 preferably contains pull-down shelves 18 to which the elements of the sample extraction apparatus 12 are attached. The shelves 18 permit easy access to the sample extraction apparatus 12. A second case 19 is provided to carry the generator vessel 10, for the few tools (not shown) necessary for operation and adjustment of the apparatus, and for spare parts.

Figure 2:
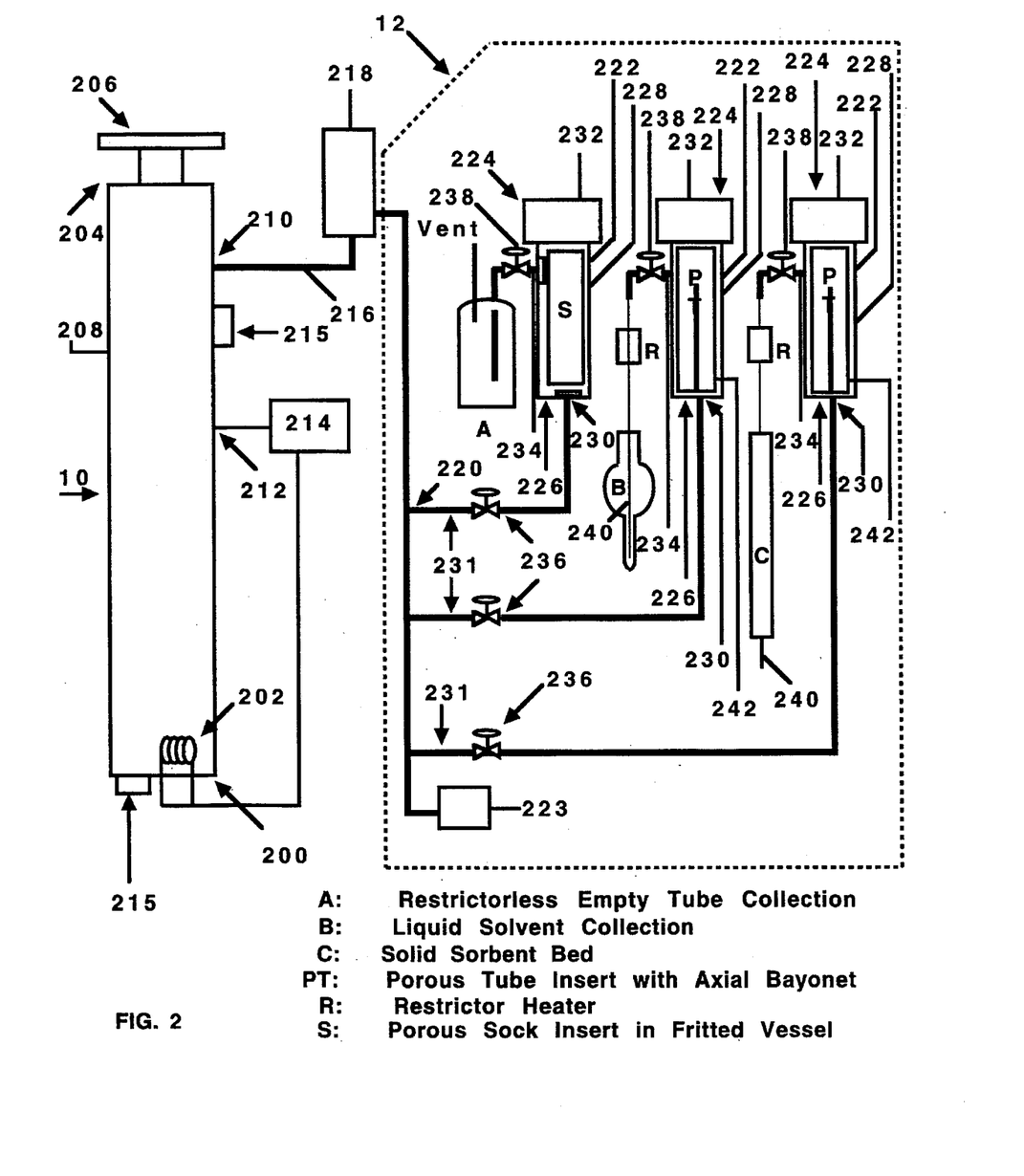
FIG. 2 is a piping and instrumentation schematic drawing of the apparatus of the present invention.
Figure 3:
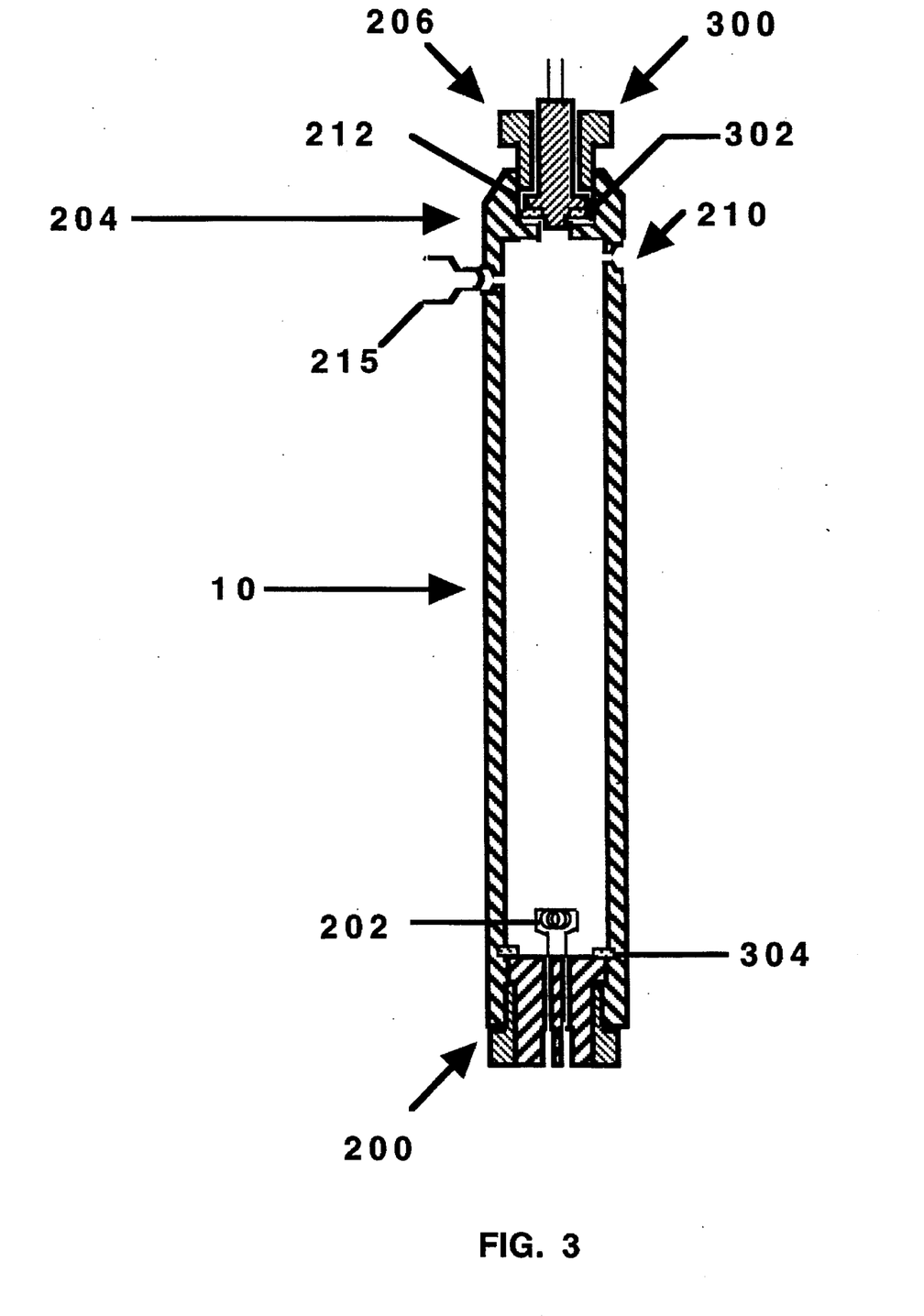
FIG. 3 is a cross section of a generator vessel.

A schematic of the apparatus for extracting organic compounds from solid materials is shown in FIG. 2. The generator vessel 10 holds solid or liquid solvent. The solvent is preferably carbon dioxide, but may also be a mixture of carbon dioxide with a polar organic solvents, including but not limited to methanol, isopropanol, and acetonitrile. The generator vessel 10 has a first end 200 that is closed and penetrated with a sealed electrical feedthrough to provide electrical power for an internal heater 202 (preferably a resistive heating element) for evaporating the solid solvent to a gas or supercritical phase. The generator vessel 10 further has a second end 204 for filling having a removable closure 206 that is removed for placing the solid solvent into the generator vessel 10 then replaced to seal the second end 204. The generator vessel 10 is further characterized by a wall 208 extending from the first end 200 to said second end 204 and penetrated with a supply outlet 210 for solvent gas. The generator vessel 10 further has a pressure transducer 212 that provides an electronic signal related to pressure of the solvent gas. The pressure transducer 212 may be located anywhere on the generator vessel 10 including the wall 208 or within the closure 206 as shown in FIG. 3. A pressure controller 214 receives the electronic signal from the pressure transducer 212 and controls the internal heater 202.

Overpressure protection of the generator vessel 10 is provided by one or more rupture discs 215. When more than one rupture disc is used, it is preferred that they be placed a distance apart on the generator vessel 10 as shown. In addition, on the solvent outlet line 216 there is a pressure regulator 218 regulating pressure to the manifold 220 of the extraction apparatus 12.

The extraction apparatus 12 has at least one extraction cell 222 having a top 224 and a bottom 226 and a wall 228 extending therebetween. The bottom 226 is sealably penetrated by an inlet 230 for solvent gas received through the manifold 220 into lateral(s) 231 and to the inlet 230. Each top 224 of each extraction cell 222 has a removable closure cap 232 and each wall 228 has an outlet port 234. Inlet pressure to the extraction cell 222 is measured using a strain gage pressure transducer 223 at the intake valve manifold.

In a preferred embodiment, the extraction cell 222 is thick-walled to contain the operating pressure from the generator vessel 10. Further preferred are three extraction cells 222. Three laterals 231 have three valves 236 to control the flow of solvent to the extraction cells 222. The extraction cell outlets 234 each have a valve 238 to control the flow of fluid exiting the extraction cell 222. With three extraction cells 222, three options for sample collection are possible as shown in FIG. 2: restrictorless empty tube collector A, liquid solvent collector B, and solid sorbent bed collector C. For liquid solvent B and solid sorbent bed C collectors, capillary restrictors 240 are used together with restrictor heater R to minimize plugging. The capillary restrictors 240 are preferably made from 100-_m i.d. fused silica capillary tubing. Previous experience has demonstrated that most restrictor plugging problems, particularly those associated with water in the sample matrix, can be eliminated by heating the restrictor to 250°–350° C. Additional heat compensates for the highly endothermic expansion process and prevents formation of multiphase supercritical fluid mixtures. For liquid solvent collection, the restrictors 240 terminate in collection vessels (A, B, or C) filled with small volumes (less than 10 mL per sample) of a liquid solvent which traps the analytes and permits the solvent to bubble through. Preferred liquid solvents are those in which the analytes of interest exhibit high solubility. Solvents useful for a variety of analytes include isopropanol and methylene chloride. Alternatively, the collection vessels (A, B, or C) may be tubes filled with solid adsorbent materials, allowing rapid interfacing with a gas chromatograph or liquid chromatograph, for example. The restrictors (or restrictorless tubing) are self-cleaning by purging with a stream of pure or polar-modified gaseous or supercritical solvent.

The generator vessel 10 and extraction cells 222 are preferably constructed of Ti-6A1-4V, a high-strength, lightweight, titanium-based alloy (chosen after comparison of special lightweight alloy materials). Power is supplied by standard 110 VAC, however, modification of the device for battery powered operation may be desirable.

An initial embodiment of the generator vessel 10 is shown in FIG. 3. The closure 206 is designed for fingertight operation, and is comprised of a high pressure strain gage pressure transducer 212, a drive nut 300, and a polymer gasket 302. The first end 200 is preferably closed with a soft metal seal 304 that is opened only for access to the internal heater 202 since the generator vessel 10 is filled through the second end 204 or the supply outlet 210.

The preferred solid solvent is dry ice, thus eliminating the bulk and safety considerations involved in transporting pressurized gas cylinders to a site and the need for a high-pressure pumping system. Although this approach requires manually loading the pressure generator with dry ice and either having a supply of dry ice or making dry ice (a relatively simple operation), it is 100% reliable and the apparatus is very rugged. Alternatively, the generator may be filled with liquid carbon dioxide, preferably from a pressurized cylinder equipped with an eductor tube and a pressurized helium headspace.

In operation, the dry ice is crushed and sealed in the generator vessel 10, then heated with the internal heater 202. Alternatively, liquid carbon dioxide is poured into the generator vessel 10, then heated. This cryopumping may supply fluid carbon dioxide at pressures exceeding 10 kbar (~145,000 psig), however, in the interest of weight conservation, it is preferred that the generator vessel 10 be designed for service to 1 kbar (~14,500 psig). The rate of heating is regulated using voltage signals from the strain gage pressure transducer 212 to maintain a reasonable supply pressure of carbon dioxide gas or supercritical phase. The design allows for the addition of a polar fluid modifier, such as methanol or acetonitrile, to the generator vessel 10, if necessary for the efficient extraction of particular compounds of interest.

Operation of the generator vessel 10 at full design pressure utilizes the maximum amount of carbon dioxide before refilling becomes necessary. A commercially available regulator 218 is therefore used to permit the generator vessel 10 to operate at full design pressure while performing extractions at a suitable working pressure, typically between 5,000 and 10,000 psig.

Flow of the carbon dioxide to any of the three extraction cells 222 is controlled by a manifold 220 with valves 232 which may be operated manually or automatically and are preferably pneumatically actuated from solvent pressure. Three extraction cells 222 permit one or two to be extracted while the third is being loaded with a new sample. Manipulation of the valves 232 permits operation in a dynamic mode (solvent flowing), a static mode (solvent not flowing), or a combination of both modes.

Figures 4A, 4B, 4C:
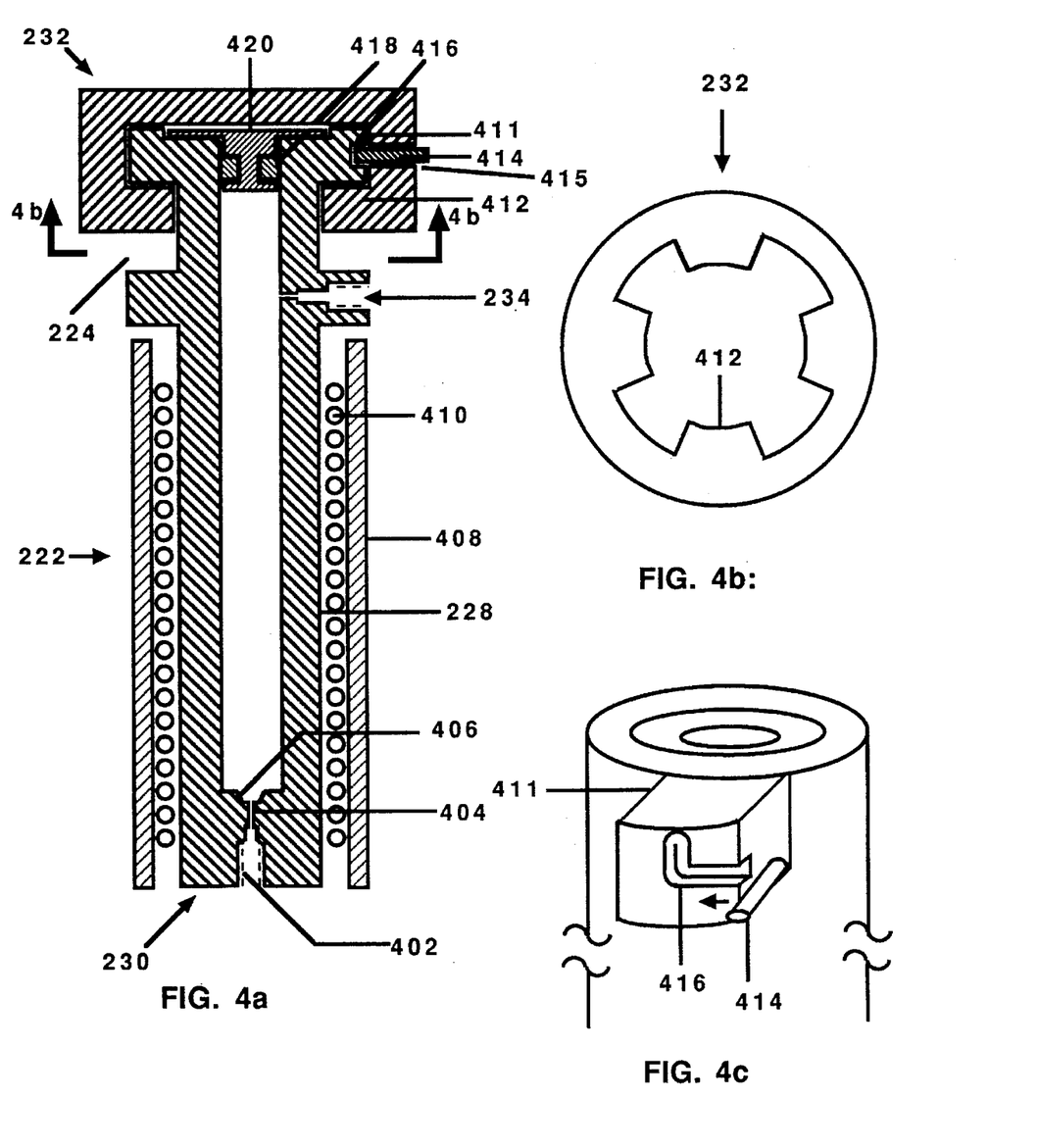
FIG. 4a is a cross section of an extraction cell.
FIG. 4b is a bottom view of a closure cap.
FIG. 4c is an isometric view of the top of an extraction cell without the closure cap.

Details of the extraction cell 222 are shown in FIG. 4a, FIG. 4b, and FIG. 4c. The extraction cell 222 is approximately 19 cm×2.9 cm o.d. and can hold various sample cartridges 242 (FIG. 2). The extraction cell 222 employs a single fingertight closure 232 at the top end 224 for easy opening and closing. During an extraction, solvent gas enters the extraction cell 222 through an inlet 230, percolates through the sample to be extracted (not shown), and exits via a port 234 in the wall 228 near the top 224. This leaves the closure 232 free of high-pressure tubing attachments, simplifying the fingertight nature of the upper closure 232. The inlet 230 has a tube connecting portion 402, a passage 404 and a sample cartridge receiving portion or seat 406. More specifically, the finger operation of the closure 232 is achieved with "Rabbit ears" 411 on the top 224 of the extraction cell body 222 that lock with "tabs" 412 in the closure cap 232. With four rabbit ears 411 and tabs 412 each oriented 90 degrees apart, a high pressure seal is obtained with a ⅛ turn of the closure cap 232. With at least two rabbit ears 411, a high pressure seal is obtainable with less than a full turn or rotation of the closure cap 232.

During operation, it is necessary to maintain the temperature of all components to prevent condensation of the solvent. Particularly during a static extraction, it is necessary to have a second heat source in addition to the internal heater 202 since heated solvent is not flowing through the extraction cell 222 during a static extraction. Solvent temperature control may be passive through the use of insulation or conductive strips, or active with the use of an external heater. In the present invention, conductive strips of copper are connected between valves and between other elements to aid in maintaining a substantially constant system temperature. In addition, a second heat source is used. The second heat source is preferably an electrical heating mantle 408. In a preferred embodiment, a coil of tubing 410 is placed between the mantle 400 and the wall 228 through which solvent is passed thereby preheating the solvent prior to entering the extraction cell 222 through the inlet 230. The coil of tubing 410 is preferably $\frac{1}{16}$-in i.d. stainless steel tubing. The sample temperature is measured using a thermocouple (not shown). A PID (Proportional/Integrating/Derivative) control is used to hold the temperature constant.

Pressure safety is a necessary consideration for operation of the apparatus of the present invention. In particular, the closure cap 232 must not be removed while the extraction cell 222 is pressurized. It is further necessary that any closure cap removal prevention assembly be fail safe. Accordingly, in a preferred embodiment, a passive closure cap removal prevention is employed that permits removal of the closure cap 232 when the extraction cell 232 is not pressurized, but prevents removal of the closure cap 232 when the extraction cell 232 is pressurized. It will be apparent to those of skill in the art that many means may be employed to provide this pressure safety feature. However, in accordance with the present invention, a pin-and-groove assembly is used. A pin 414 is inserted through a hole 415 in the closure cap 232 (FIG. 4a, FIG. 4c) and engages a dog-leg groove 416 on rabbit ear 411 (FIG. 4c) thereby locking the closure cap 232 in place when the vessel 222 is pressurized and preventing removal of the closure cap 232 during pressurized operation.

A commercially available spring-loaded polymer seal 418 mounted on a support 420 attached to the interior of the closure cap 232 provides a high pressure seal.

Figure 5:
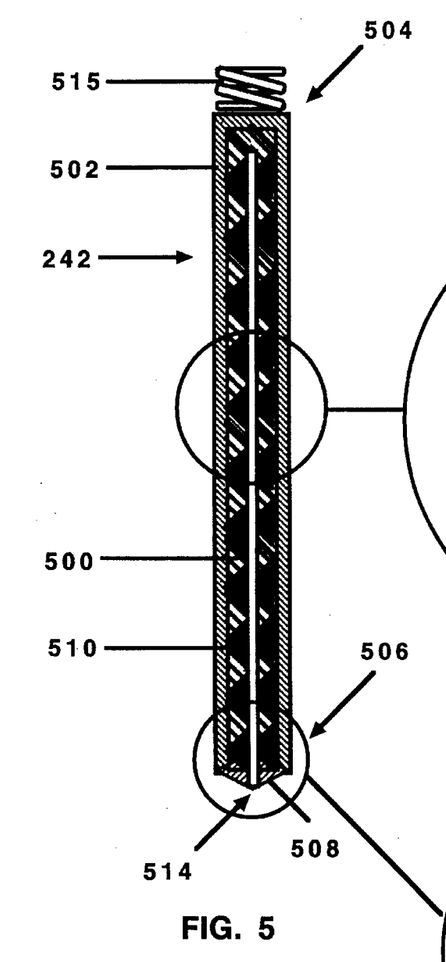
FIG. 5 is a cross section of a sample cartridge.
Figure 5A:
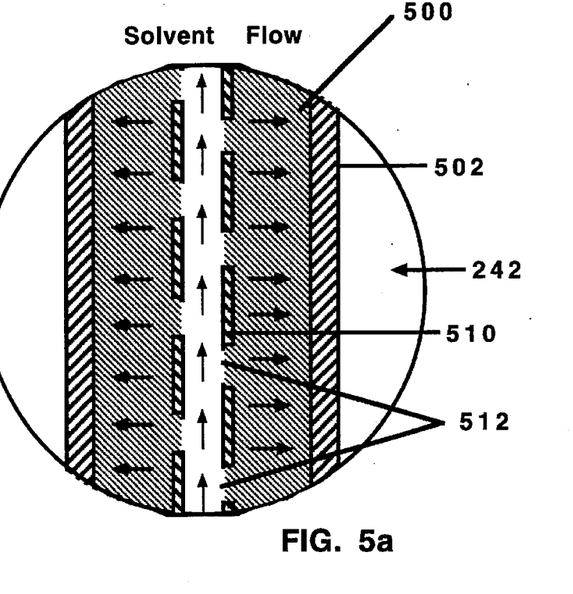
FIG. 5a is a cross section of a sample cartridge center portion.
Figure 5B:
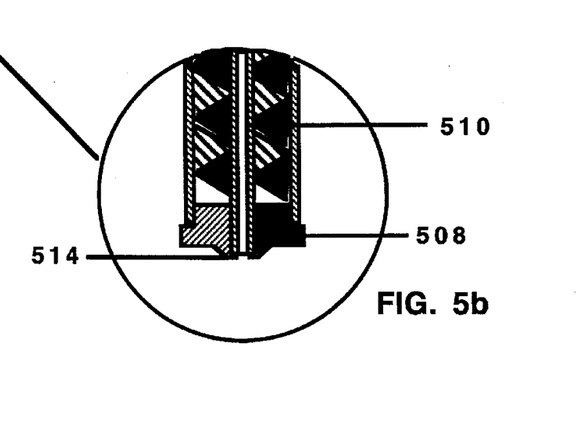
FIG. 5b is a cross section of a sample cartridge bottom end.

Details of a sample cartridge 242 are shown in FIG. 5, FIG. 5a, and FIG. 5b. Solid matrix sample 500, such as soil, is placed in the sample cartridge 242. The sample cartridge wall 502 is gas permeable, preferably a sintered metal cylinder or tube with the top end 504 closed. The sample cartridge 242 is approximately 13 cm×1.3 cm o.d., with a sample volume of approximately 9.7 mL (~10 g). The pore size of the metal for the wall 502 is preferably about 10 microns to contain soil grains and prevent plugging the capillary tube flow restrictors 240 (FIG. 2). The bottom end 506 (FIG. 5b) is fitted with an end cap 508 through which a bayonet tube 510 is attached. The bayonet tube 510 is preferably about $\frac{1}{16}$" diameter tubing vented with holes 512 (FIG. 5a) permitting gaseous or supercritical solvent to diffuse through the sample 500. These cartridges 242 fit into the extraction cell 222 and eliminate the need for fritted ports. The use of the bayonet tube 518 minimizes the flow path of solvent through the sample matrix, e.g., path length equals the radius of the sample matrix compared to the length of the sample matrix in traditional configurations, which enhances mass transfer of matrix bound analytes to the supercritical phase and avoids potential loss of analyte solubility from pressure drop through the matrix bed. With the tip 514 of the end cap 508 placed in the seat 406, the supercritical or gaseous solvent flows into the sample 500 and through the tube wall 502 in radial rather than axial flow thereby permitting better contact between the sample 500 and the gaseous or supercritical solvent. Channeling along the vessel wall 502 is likewise eliminated. Should a significant pressure differential develop between the bayonet tube 510 and the porous tube 502, the sample cartridge 242 will lift off the seat 406 permitting gaseous or supercritical solvent to bypass the sample 500, thereby equalizing the pressure. The sample cartridge 242 will then reseat itself. It is preferred that a spring 515 be placed in compression between the top 504 and the closure 232 to assist reseating.

The extraction cell 222, sample cartridge 242, bayonet tube 510 and manifold tubing 220 are self-cleaning by purging with a stream of pure or polar-modified gaseous or supercritical solvent.

The apparatus may be controlled by hand, but is preferably controlled with a programmable logic controller (not shown) for automated operation of valve (236, 238) sequencing. The extractions are preferably performed as a series of static extractions (fluid held under temperature and pressure conditions without flow for a time, i.e., both the intake valves 236 and outlet valves 238 closed after filling the extraction cell 222 with fluid), followed by dynamic extractions (flowing condition, i.e., both intake valves 236 and outlet valves 238 open). Extractions performed in this manner wherein the static extractions are over a longer time than the dynamic extractions, permit the most efficient use of gaseous or supercritical solvent supply. Pressure is bled off at the end of the extraction by closing the intake valve 236 with the outlet valve 238 open. The extraction cells 222 are each preferably equipped with a red and green light to indicate pressurized and non-pressurized status, respectively, to indicate when it is safe to open an extraction cell. The apparatus is preferably operated using two extraction cells simultaneously, with the third one open for sample change out while the other two are alternating between the static and dynamic operation modes. High sample throughput is obtained through tandem operation of the multiple extraction cells and use of combination static/dynamic extraction modes.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for extracting organic compounds from solid materials, comprising:
    (a) a generator vessel for receiving a solid or liquid solvent, said generator vessel having a first end closed and penetrated with a sealed electrical feedthrough to a resistive heating element, a second end having a removable closure, said closure removed for placing the solid solvent into the generator vessel then replaced to seal said fill end, and a wall extending from said first end to said second end and penetrated with an outlet for gaseous or supercritical solvent, said generator vessel further having a pressure transducer that provides an electronic signal related to pressure of the gaseous or supercritical solvent;

(b) at least one extraction cell having a top and a bottom and a wall extending there between, wherein said bottom is penetrated by an inlet for gaseous or supercritical solvent received through a manifold connected to said outlet, said top having a removable closure cap, and said wall having an outlet port; and (c) a sample cartridge having a wall that is solvent permeable for holding the solid materials, said sample cartridge placed within said extraction cell.

2. The apparatus as recited in claim 1, further comprising a pressure regulator receiving the gaseous or supercritical solvent from said outlet and regulating pressure to said manifold.

3. The apparatus as recited in claim 1, further comprising a pressure controller that receives the electronic signal from the pressure transducer and controls said resistive heating element.

4. The apparatus as recited in claim 1, wherein said sample cartridge further comprises a bayonet tube having holes, said bayonet tube connected through an end cap attached to a bottom end of said sample cartridge, thereby receiving said solvent into said bayonet tube and directing said solvent through said holes into said sample and out of the solvent permeable wall of the sample cartridge.

5. The apparatus as recited in claim 4, wherein said inlet has a seat and said sample cartridge has a tip that is held against said seat by a spring placed in compression between a top of said sample cartridge and said closure cap wherein excess pressure between said manifold and said extraction cell overcomes the spring and lifts the sample cartridge permitting solvent to bypass said sample cartridge and flow through the extraction cell.

6. The apparatus as recited in claim 5, wherein each of said extraction cells has at least two "rabbit-ears" on a top of the extraction cell, and wherein said removable closure cap has at least two tabs that lock with said rabbit ears wherein a high pressure seal is obtained with less than a full rotation of said removable closure cap.

7. The apparatus as recited in claim 6, further comprising an assembly that prevents removal of the closure cap when the extraction cell is pressurized.

8. The apparatus as recited in claim 7, wherein said assembly comprises at least one rabbit ear having a dog-leg groove on an outer face wherein a locking pin is inserted through a hole in said removable closure cap thereby preventing said removable closure cap from being removed while the extraction cell is pressurized.

9. The apparatus as recited in claim 1, wherein said inlet has a seat and said sample cartridge has a tip that is held against said seat by a spring placed in compression between a top of said sample cartridge and said closure cap wherein excess pressure between said manifold and said extraction cell overcomes the spring and lifts the sample cartridge permitting solvent to bypass said sample cartridge and flow through the extraction cell.

10. The apparatus as recited in claim 9, wherein each of said extraction cells has at least two "rabbit-ears" on a top of the extraction cell, and wherein said removable closure cap has at least two tabs that lock with said rabbit ears wherein a high pressure seal is obtained with less than a full rotation of said removable closure cap.

11. The apparatus as recited in claim 10, further comprising an assembly that prevents removal of the closure cap when the extraction cell is pressurized.

12. The apparatus as recited in claim 11, wherein said assembly comprises at least one rabbit ear having a dog-leg groove on an outer face wherein a locking pin is inserted through a hole in said removable closure cap thereby preventing said removable closure cap from being removed while the extraction cell is pressurized.

* * * * *

UNITED STATES PATENT AND TRADEMARK OFFICE
CERTIFICATE OF CORRECTION

PATENT NO. : 5,637,209
DATED : June 10, 1997
INVENTOR(S) : Wright, et al

It is certified that error appears in the above-identified patent and that said Letters Patent is hereby corrected as shown below:

On title page, item [73], please replace "Wis." with --Wash.--.

Signed and Sealed this

Second Day of December, 1997

Attest:

BRUCE LEHMAN

Attesting Officer

Commissioner of Patents and Trademarks